United States Patent [19]

Coates

[11] 4,082,887
[45] Apr. 4, 1978

[54] COATING COMPOSITION FOR A FIBROUS NONWOVEN SHEET OF POLYOLEFIN

[75] Inventor: Don Mayo Coates, Richmond, Va.

[73] Assignee: E. I. Du Pont de Nemours and Company, Wilmington, Del.

[21] Appl. No.: 686,509

[22] Filed: May 14, 1976

[51] Int. Cl.$^2$ .................................................. C09D 3/00
[52] U.S. Cl. ................................ 428/289; 260/28.5 R; 260/28.5 A; 260/28.5 AV; 427/385 B; 428/290; 428/484; 427/390 B
[58] Field of Search ...................... 260/28.5 R, 28.5 A, 260/28.5 AV; 427/385 B, 390 B; 526/2; 428/289, 290, 484

[56] References Cited

U.S. PATENT DOCUMENTS

| 3,247,018 | 4/1966 | Hagge et al. | 427/390 B |
| 3,821,021 | 6/1974 | McMillin | 427/385 X |

FOREIGN PATENT DOCUMENTS

| 1,207,680 | 2/1960 | France | 427/385 |
| 47-8,797 | 3/1972 | Japan | 427/385 |

*Primary Examiner*—Michael R. Lusignan

[57] ABSTRACT

There is disclosed a coating composition which when applied on a fibrous nonwoven sheet of polyolefin and dried provides a sheet having antistatic properties, high water barrier and antislip properties. The composition consists essentially of (a) an effective amount of a water-insoluble wax which is dispersible in water at a concentration of 10% by weight based on the total amount of wax and water, the wax requiring for dispersion in water only a nonionic surfactant or a mixture of two or more nonionic surfactants in an amount of at least 15% and not more than 100% by weight based on the amount of wax, the nonionic surfactant having a hydrophilic-lipophilic balance of from about 6–10; (b) an effective amount of an antistat having the formula $M_nR_{3-n}PO_4$ where M is a lithium, sodium, potassium or ammonium ion, R represents an alkyl group containing from 3–5 carbon atoms, and $n$ is 1 or 2; (c) a nonionic surfactant having a hydrophilic-lipophilic balance of from about 6–10, the surfactant being present in an amount of from about 15–100% by weight based on the amount of wax; (d) a water-insoluble binder resin capable of wetting the polyolefin sheet, having a Tg of from about 20°–50° C and which, in the form of an aqueous dispersion, does not coagulate in the presence of the antistat; (e) water; and optionally about 1–6% by weight of a pigment, based upon the weight of the coating composition when dried; solids being present in the composition in an amount of from about 10–40% by weight. Nonwoven fibrous sheets of polyolefin coated with the composition are also disclosed.

12 Claims, No Drawings

COATING COMPOSITION FOR A FIBROUS NONWOVEN SHEET OF POLYOLEFIN

BACKGROUND OF THE INVENTION

This invention is related to a coating composition which when applied on a fibrous nonwoven sheet of a polyolefin and dried provides a sheet having water barrier, antistatic, and antislip properties and is related to sheets coated with the composition.

Nonwoven fibrous sheets of polyolefins have found utility in a multitude of applications due to their combination of tensile and aesthetic properties at low cost. Some nonwoven fibrous polyolefin sheets display inherent water barrier properties whereas most other nonwoven fibrous sheets of a polyolefin lack appreciable inherent water barrier properties. Nonwoven fibrous polyolefin sheets possessing liquid barrier properties have potential advantages in a variety of applications including disposable protective garments such as surgeons' gowns; protective wrap for various commodities such as carpets, fiber bales, lumber and grain; sterile packaging permeable to sterilizing gases but impermeable to bacteria or liquids; and consumer products such as wind breakers, rainwear and sleeping bag liners.

A decided disadvantage of articles made from nonwoven fibrous polyolefin sheets is the well-known propensity of these articles to accumulate static charges. The conventional technique of simply applying antistat finishes to the nonwoven sheet does not ordinarily lead to a satisfactory solution, since in general finishes which adequately suppress static charge generation simultaneously diminish whatever water barrier property which the nonwoven fibrous polyolefin sheet inherently possessed.

Although the prior art has employed coating compositions which may be applied to various fibrous sheets to impart high water barrier performance thereto, these compositions generally do not simultaneously impart both high water barrier and good antistatic properties. Hydrophobic ingredients are required in order to impart good water barrier performance whereas good antistat materials are commonly hydrophilic. Attempts to combine the two components into a single coating composition ordinarily lead to incompatibility problems in formulation and/or destruction of one or both of the desired effects.

U.S. Pat. No. 3,821,021, issued to McMillin on June 28, 1974, discloses a limited class of finishing agents which can be applied onto certain nonwoven sheets composed of polyolefin film-fibril elements to confer antistatic protection without destruction of the sheets' inherent liquid barrier properties. These finishing agents which are said to possess a balance of high antistat activity and moderate aqueous surfactant power are defined by the formula: $M_nR_{3-n}PO_4$ where M is selected from the group consisting of lithium, sodium, potassium, and ammonium ions; R represents an alkyl group containing 3 to 5 carbon atoms, and $n$ is selected from the integers 1 and 2. However, these finishing agents do not impart acceptable water barrier properties to a nonwoven fibrous polyolefin sheet which does not inherently possess an adequate water barrier level.

French Pat. No. 1,207,680 discloses a coating composition which can be used to impart water and grease impermeability to paper materials and which is useful for coating textile materials. The composition comprises an emulsion of polyvinyl acetate; a wax emulsion; a protective colloid for both emulsions, emulsifying agents, which for the wax emulsion can be the esters of the monolaurate, monooleate, and monostearate type known by the name "Spans" (manufactured by Atlas Powder Co.) or the polyoxyethylene derivates of these esters, for example, the monolaurate of polyoxyethylene sorbitan known by the name "Tweens", and optionally a small quantity of pigment. This coating composition does not impart acceptable antistatic properties to the textile materials.

The problem of imparting antistatic properties to polyolefin articles while maintaining or simultaneously improving their water barrier character has also been attacked. For instance, Japanese patent application publication No. 47-8797/1972 discloses a method of providing water-proofing and/or oil-proofing, and antistatic property to hydrophobic fiber goods, such as knitted and woven products, comprising treating one side of the hydrophobic fiber material with a water-proofing and/or oil-proofing agent and treating the other side with a solution of an antistatic agent. Differences in surface tensions are utilized to accomplish the desired result. This technique requires a two-step application of two separate coating compositions and the resulting product exhibits its water barrier and antistatic properties at opposite surfaces.

A need still exists in the art for a single coating composition which when applied to a nonwoven fibrous polyolefin sheet and dried will provide a sheet having both antistatic and high water barrier properties.

SUMMARY OF THE INVENTION

There has been discovered a coating composition which when applied on a fibrous nonwoven sheet of a polyolefin and dried provides a sheet having antistatic properties, high water barrier and antislip properties. The composition of the invention additionally provides an opportunity to incorporate pigments to achieve an unlimited range of colored products. The composition consists essentially of (a) an effective amount of a water-insoluble wax which is dispersible in water at a concentration of 10% by weight based on the total amount of wax and water, said wax requiring for dispersion in water only a nonionic surfactant or a mixture of two or more nonionic surfactants in an amount of at least 15% and not more than 100% by weight based on the amount of wax, said nonionic surfactant having a hydrophilic-lipophilic balance of from about 6–10; (b) an effective amount of an antistat having the formula, $M_nR_{3-n}PO_4$, where M is selected from the group consisting of lithium, sodium, potassium, and ammonium ions, R represents an alkyl group containing from 3 to 5 carbon atoms, and $n$ is selected from the integers 1 and 2; (c) a nonionic surfactant having a hydrophilic-lipophilic balance of from about 6–10, said surfactant being present in an amount of from about 15–100% by weight based on the amount of wax; (d) a water-insoluble binder resin capable of wetting the polyolefin sheet, having a Tg of from about 20°–50° C, and which, in the form of an aqueous dispersion, does not coagulate in the presence of the antistat; and (e) water; solids being present in said composition in an amount of from about 10–40% by weight. In a preferred embodiment, the composition also contains a pigment in a concentration of from about 1–6% by weight based upon the weight of the coating composition when dried.

There is also provided a nonwoven sheet of a polyolefin coated with the composition of the invention. In a preferred embodiment the nonwoven sheet is comprised of film-fibril elements of a polyolefin, most preferably polyethylene.

DETAILED DESCRIPTION OF THE INVENTION

The coating composition of the invention is an aqueous dispersion consisting essentially of (a) a water-insoluble wax, (b) an antistat, (c) a nonionic surfactant, (d) a water-insoluble binder resin, and (e) water, each of the first four components having the aforesaid properties and being present in the aforesaid amounts where specified.

The water-insoluble wax suitable for use in the coating composition of the invention is capable of being dispersed in water at a concentration of 10% by weight based on the total amount of wax and water. The water-insoluble wax requires for dispersion in water only a nonionic surfactant in an amount of at least 15% and not more than 100% by weight based on the amount of wax, the nonionic surfactant having a hydrophilic-lipophilic balance of from about 6-10. The water-insoluble wax is also suitable if it requires for dispersion in water a mixture of two or more such nonionic surfactants. The term "wax" as used herein denotes a substance fulfilling the modern usage definition given on page 721 of "Hackh's Chemical Dictionary", 4th ed., McGraw-Hill Co., N.Y., 1969.

A preferred wax for the composition of the invention is an ethylene diamine bisamide wax sold by Cincinnati Milacron Chemicals, Inc. of New Brunswick, New Jersey under the name "Advawax" 225. This wax is known to be useful as a lubricant for thermoplastic and thermoset resins to provide antiblock, antitack and antistatic properties; however, the level of antistatic properties provided by the wax, when used in a coating composition of the type disclosed herein without another antistat, is orders of magnitude insufficient to meet the needs of the present invention. Other waxes suitable for the composition of the invention include "Advawax" 140, a product of Cincinnati Milacron Chemicals, Inc.; "Mooreflake" 160, a product of Moore and Munger, Inc.; and "Mobilwax" 150 and "Mobilwax" 2305, both being products of the Mobil Oil Company. The wax is present in the composition of the invention in an amount sufficient, i.e., an effective amount, so that when the composition is coated on a nonwoven polyolefin sheet at a desired level of coverage and dried, water-barrier properties, are imparted to said sheet. Suitable concentrations of wax are from about 15-40% by weight based on the amount of the resin in the composition.

Another component of the coating composition of the invention is an antistat as set forth in U.S. Pat. No. 3,821,021. These antistats have the formula $M_nR_{3-n}PO_4$ where M, R and n are as set forth hereinabove. A preferred antistat is a mixture of approximately equimolar quantities of potassium dibutyl phosphate and dipotassium butyl phosphate. The antistat is present in sufficient amount, i.e., an effective amount, to impart antistatic properties as set forth later herein, to the polyolefin sheet when coated thereon and dried. Typical amounts of antistats range from about 5-15% by weight based upon the amount of resin. Since, ordinarily, the antistat is commercially available as an aqueous solution, the amount of aqueous antistat employed will be dependent upon the concentration of the solution. Too much antistat in the composition will cause a loss of hydrostatic barrier properties and will result in incompatability with the binder dispersion.

The coating composition of the invention contains a nonionic surfactant which has a hydrophilic-lipophilic balance (HLB) of from about 6-10. A HLB lower than 6 results in uneven application of the coating whereas a value higher than 10 causes loss of water resistance. HLB is defined as the percentage weight of the hydrophilic portion of a nonionic emulsifier molecule and is described in "The Atlas HLB System", 4th printing, edited and reprinted from Chemmunique, a publication of Atlas Chemical Industries, Inc. The surfactant should not cause the dispersion of binder resin to coagulate. Suitable nonionic surfactants include mixtures of the esters of the monolaurate, monoleate and monostearate type called "Spans", a product of Atlas Powder Company and the polyoxyethylene derivatives of these esters, which are known as "Tweens", a product of Atlas Powder Company. A mixture containing 83% by weight of "Span" 80 and 17% by weight of "Tween" 80 will provide an HLB of 6, whereas a mixture containing 46% weight of "Span" 80 and 54% by weight of "Tween" 80 will provide an HLB of 10.

The surfactant is employed in an amount of from about 15-100% by weight, based on the amount of wax. If surfactant is used in an amount substantially in excess of the above prescribed maximum, foaming of the coating composition and a decrease in the hydrostatic barrier performance of the coating made from the composition can result. It is preferred that the amount of surfactant is just sufficient to effect dispersion of the wax in water.

There is present in the instant composition a water-insoluble binder which is capable of wetting the polyolefin sheet (oleophilicity). Whether or not a particular binder resin possesses the requisite oleophilicity for purpose of the present invention is determined by a test in which an aqueous dispersion of the particular binder resin is diluted to 25% solids and then, with a number 16 Meyer rod, a film of the diluted resin dispersion is drawn onto a candidate substrate. If the resulting wet film is smooth and unbroken and remains intact upon drying, e.g., three minutes' exposure in air at 110° C, the binder resin meets the criteria of "wetting" as used herein. Furthermore, the binder resin should not possess an excessive degree of oleophilicity, i.e., it should not impregnate the substrate under the conditions of the above-described test.

Another requirement for binder resins which are suitable for use in the present coating composition is that the resin should have a glass transition temperature, Tg, of from about 20°-50° C. A resin having a Tg lower than about 20° C leads to tackiness in coatings made therewith whereas a resin having a Tg higher than about 50° C leads to brittleness and poor adhesion of a coating made therewith. However, a resin having a higher Tg can be used if a plasticizer is added to bring the Tg of the resulting modified resin within the above range. Furthermore, binder resin dispersions suitable for the present invention do not coagulate in the presence of the antistat. A test to determine whether a particular binder resin dispersion possesses this coagulation property can be performed by diluting the particular binder resin dispersion to 25% solids by weight, adding together about 70 parts of weight of the diluted resin dispersion and about 2 parts by weight of the aqueous antistat, and observing whether or not coagulation occurs.

The proportion of binder resin employed in the composition of the invention is not critical and will depend upon the particular binder resin being used. In a preferred embodiment the binder resin is present in about 40–80% by weight, based upon the weight of the coating composition when dried. Suitable aqueous dispersions of resins include an ethylene vinyl acetate copolymer dispersion and an ethylene/methacrylic acid copolymer dispersion as described in U.S. Pat. No. 3,487,036 issued to Bissot on Dec. 30, 1969; a dispersion of cross-linked terpolymer of ethyl acrylate/styrene/acrylonitrile having a Tg of 20° C; a dispersion of cross-linked terpolymer of ethyl acrylate/styrene/acrylonitrile having a Tg of 33° C; and a dispersion of a copolymer of 85 parts ethylene/15 parts methacrylic acid which has been partially neutralized with potassium hydroxide as described in U.S. Pat. No. 3,264,272. These resin dispersions are usually supplied commercially with about 50% solids by weight. Preferred resins for use in the composition are the two aforementioned terpolymer compositions, since they are commercially available.

The coating composition of the invention optionally but preferably contains one or more pigments in a concentration of from about 1–6%, preferably 1–4%, by weight based upon the weight of the coating composition when dried. Organic and inorganic pigments are both suitable for purposes of the present invention. Examples of suitable pigments are those made by Du Pont Co. under the names of "Dalamar" Yellow, "Monastral" Blue and "Monastral" Red, which have approximately 29, 37 and 19% solids by weight, respectively.

The total solids content of the composition of the invention is from about 10–40% by weight. A solids content less than about 10% will necessitate an excessive drying time whereas a solids content in excess of 40% will present possible viscosity problems.

The components of the coating composition are mixed in aqueous medium to obtain the composition of the invention. When using the binder resin dispersion described in U.S. Pat. No. 3,487,036, a preferred method for preparing the present composition comprises mixing the wax and surfactant together to obtain a slurry, melting the slurry, and adding thereto sufficient hot water to obtain a dispersion having the desired concentrations of wax and surfactant. The pigment, if desired, and antistat are mixed with a desired amount of water after which the wax dispersion prepared as described above is added thereto with moderate mixing until a well blended dispersion is obtained. The mixing rate is reduced and the aqueous dispersion of binder resin is added to the dispersion. Care is taken that the resulting dispersion is not overmixed. The coating composition resulting from this sequence of steps has optimum properties for purposes of this invention.

Another aspect of this invention is a fibrous polyolefin sheet coated with the composition of the invention. The coating composition can be applied to a fibrous polyolefin substrate by air knife coating, Meyer rod coating, gravure roll coating, the kiss-roll method, etc., but air knife coating is preferred. The coating composition is preferably applied at a weight of from about 3.4–6.8 g/m² (0.1–0.2 oz/yd²) when the substrate is a nonwoven sheet of film-fibril elements of polyethylene. The coated substrate is dried at an elevated temperature, such as in a hot air oven, to evaporate liquid, to coalesce and cure the binder, and to insure uniform spreading of binder and wax.

Fibrous polyolefin sheets which can be coated with the present composition include nonwoven sheets of linear polyethylene, blends of linear polyethylene and minor amounts of branched polyethylene, polypropylene, polybutene, and polyisobutylene. The nonwoven sheet can be composed of continuous filaments, staple fibers or fibrillated films. A preferred embodiment is a coated nonwoven sheet of film-fibril elements of polyolefin, most preferably polyethylene. Nonwoven sheets of film-fibril elements of polyolefin can be prepared by the process of U.S. Pat. No. 3,169,899 issued to Steuber on Mar. 22, 1961. Coated sheets of the invention comprising nonwoven sheets of film-fibril elements of polyethylene coated with the composition of the invention display high water barrier, softness and aesthetics along with requisite antistatic properties to be highly suited for use in protective garments.

This invention is further illustrated by the following examples in which antistat protection provided by a coating prepared from a composition of the invention is determined by submitting a coated sample which was previously conditioned at least 24 hours at 23.9° C (75° F)/ 55% R.H. (relative humidity), to test NFPA (National Fire Protection Association) Code 56A, Section 25433, paragraph A, part 3. The result is reported as "Log R" with values of 10.5 or lower representing acceptable antistatic properties and a value of about 9.5 being preferred. The "Log R" value is determined for several different portions of the coated sample and the average value of the several determinations is used as the reported value. water barrier performance of a coated sample is measured by the "hydrostatic heat" test ASTM D-583, paragraph 53A, Method II, with results reported in centimeters (inches), higher values being preferred. The expression "high water barrier" as used herein means a "hydrostatic head" of at least 63.5 cm (25 inches) as measured by this test. In all the Examples, the surfactant is a mixture of a "Span" and a "Tween"; the wax is "Advawax" 225; and weights given for resins and pigments refer to the corresponding aqueous dispersion. The aqueous dispersions of ethylene vinyl acetate copolymer and of ethylene/methacrylic acid copolymer are those described in U.S. Pat. 3,487,036 and have 50% (wt.) resin.

EXAMPLE 1

A mixture of wax and surfactant is prepared by blending 6 g of the former and 4 g of a surfactant comprising 65% by weight of "Span" 80 and 35% by weight of "Tween" 80 (gives an HLB of 8). The mixture is melted by heating it to approximately 121.1° C (250° F). To the melted mixture are added slowly 60 g of hot water, having a temperature of approximately 60° C (140° F), with stirring to form an emulsion, which when cooled, is a white paste similar to whipped cream in consistency, although somewhat thicker.

One gram of "Zelec" TY, an aqueous solution containing 50% by weight of potassium butyl phosphate, a product of the Du Pont Co., 0.3 g of "Monastral" Blue and 0.175 g of "Dalamar" Yellow are added to 30 g of water with stirring. To the resulting mixture are added 20 g of the wax emulsion described earlier in this Example. Moderate mixing is used until the resulting mixture is well-blended, after which the mixing rate is reduced and 10 g of an aqueous dispersion of an ethylene vinyl acetate copolymer are slowly added to the mixture to obtain a composition of the invention, while care is taken that the mixture is not overstirred.

When the above coating composition is applied at a concentration of 3.4 g/m² (0.1 oz/yd²) to a nonwoven sheet comprising film-fibril elements of linear polyethylene having a basis weight of about 42.5 g/m² (1.25 oz/yd²) and being cross or linen x rib embossed, the resulting coating is dried, and the resulting coated sheet is rotary softened by a procedure similar to that set forth in U.S. Pat. No. 3,920,874 and then tested, hydrostatic head averages over 127 cm (50 inches) for the first drop and Log R averages 10.0 on the coated side. A dilute, e.g., a 1–2% by weight aqueous solution of "Zelec" TY, is sprayed on the uncoated side of the sheet, if static protection on both sides is desired. A slip angle of 30° is observed for the coated product, the slip angle being that angle at which a sample covered 2.27 kg (5 pound) steel block of 106 cm² (16.5 in²) of contact surface will slip on a stainless steel incline ramp.

EXAMPLE 2

A wax mixture (wax and surfactant) is prepared in the same manner and having the same ingredients as the wax mixture of Example 1 except that 2 g of surfactant and 120 g of hot water are used. One gram of "Zelec" TY, 0.35 g of "Monastral" Blue, 0.7 g of "Monastral" Red B, 0.2 g of "Dalamar" Yellow and 20 g of water are mixed together and 20 g of the above-described wax mixture are added thereto with moderate mixing until well blended. After the mixing rate is reduced, 10 g of an aqueous dispersion of ethylene/methacrylic acid copolymer are slowly added to form the coating composition.

When this coating composition is applied pursuant to the procedure in Example 1 to a nonwoven sheet of film-fibril elements of linear polyethylene as set forth in said Example, the resulting coating displays properties similar to those of the coatings in Example 1, but have better dry crock and alcohol resistance. Crocking resistance of the coating is determined by rubbing it lightly three times with a tissue.

EXAMPLE 3

A coating composition having approximately a 4% by weight pigment concentration is prepared pursuant to the procedure of Example 1 using the following ingredients:

1 g of "Zelec" TY
0.4 g of "Monastral" Blue
0.8 g of "Monastral" Red B
0.2 g of "Dalamar" Yellow
10 g of a dispersion of an ethylene vinyl acetate copolymer
20 g of a wax emulsion, the suffactant contained therein having an HLB of 8
10 g of H₂O When the composition is applied at a concentration of 3.4 g/m² (0.1 oz/yd²) to a nonwoven sheet of polyethylene film-fibril elements, the coating formed is an intense blue-gray color. Dry crock resistance is acceptable.

EXAMPLE 4

A wax mixture is made pursuant to the details given in Example 1 except that 2 g of surfactant are used. To 20 g of the wax mixture are added with mixing 5 g of a dispersion of a cross-linked terpolymer of ethyl acrylate/styrene/acrylonitrile having a Tg of 20° C and 15 g of a dispersion of a cross-linked terpolymer of ethyl acrylate/styrene/acrylonitrile having a Tg of 33° C. The terpolymers are added as 50% by weight aqueous dispersions. Next there is added with moderate mixing a slurry of 2 g of "Zelec" TY, 0.7 g "Monastral" Blue, 1.4 g "Monastral" Red B and 0.4 g of "Dalamar" Yellow in 30 g of water to form the coating composition.

When this composition is applied at a concentration of 3.4 g/m² (0.1 oz/yd²) to a linen x rib embossed nonwoven sheet of polyethylene film-fibril elements and dried, and the resulting dried coated sheet is rotary softened, the hydrostatic head averages about 104.1 cm (41 inches) of water. Log R averaged 9.3 on the coated side.

EXAMPLE 5

A copolymer of 85 parts ethylene/15 parts methacrylic acid which has been partially neutralized with potassium hydroxide as described in U.S. Pat. No. 3,264,272 is employed as a binder resin in the form of a 30% solids aqueous dispersion. Although this dispersion as received coagulates on addition of "Zelec" TY, it can be stabilized for use in the compositions of the present invention by addition of suitable nonionic surfactant and by employing a suitable mixing procedure.

The "as received" binder resin dispersion is stabilized by adding to 20 grams of it a solution of 0.5 grams of a surfactant having a HLB of 8 (65% "Span" 80 and 35% "Tween 80") in 20 grams of water to obtain a mixture which is stirred at moderate speed. After 10 minutes, a solution of 2 grams "Zelec" TY in 30 grams of water is added dropwise to the mixture. When addition of the "Zelec" solution is completed, 0.7 grams of "Monastral" Blue, 1.4 grams of "Monastral" Red B, 0.4 grams of "Dalamar" Yellow, 10 grams of a 22% solids anionic aqueous dispersion of a fluoropolymer useful as an alcohol repellent, and 20 grams of a wax emulsion similar to that used in Example 4 are added successively to obtain a composition of the invention. The composition is coated onto a polyolefin nonwoven substrate in a manner similar to the procedure described in Example 1 to provide a product exhibiting high water barrier, antistatic and antislip properties. In addition, the fluoropolymer ingredient incorporated into the composition provides a coating which also exhibits good alcohol barrier performance.

I claim:

1. A coating composition which when applied on a fibrous nonwoven sheet of polyolefin and dried provides a sheet having antistatic properties, high water barrier and antislip properties, said composition consisting essentially of
  (a) an effective amount of a water-insoluble wax which is dispersable in water at a concentration of 10% by weight based on the total amount of wax and water, said wax requiring for dispersion in water only a nonionic surfactant or a mixture of two or more nonionic surfactants in an amount of at least 15% and not more than 100% by weight based on the amount of wax, said nonionic surfactant having a hydrophilic-lipophilic balance of from about 6–10, said wax providing said water barrier properties;
  (b) an effective amount of an antistat having the formula $M_n R_{3-n} PO_4$ where M is selected from the group consisting of lithium, sodium, potassium and ammonium ions, R represents an alkyl group containing from 3 to 5 carbon atoms, and *n* is selected from the integers 1 and 2;
- (c) a nonionic surfactant having a hydrophilic-lipophilic balance of from about 6–10, said surfactant being present in an amount of from about 15–100% by weight based on the amount of wax;
- (d) a water-insoluble binder resin capable of wetting the polyolefin sheet, having a Tg of from about 20°–50° C and which, in the form of an aqueous dispersion, does not coagulate in the presence of the antistat; and
- (e) water; solids being present in said composition in an amount of from about 10–40% by weight.

2. The composition of claim 1 wherein the antistat is a mixture of potassium dibutyl phosphate and dipotassium butyl phosphate.

3. The composition of claim 1 wherein the binder resin is present in a concentration of from 40–80% by weight based upon the weight of the composition when dried.

4. The composition of claim 1 wherein the binder resin is a mixture of a cross-linked terpolymer of ethyl acrylate, styrene and acrylonitrile having a Tg of about 20° C and a cross-linked terpolymer of ethyl acrylate, styrene and acrylonitrile having a Tg of about 33° C.

5. The composition of claim 1 containing pigment in a concentration of from about 1–6% by weight based upon the weight of the coating composition when dried.

6. The composition of claim 4 containing from about 1–6% by weight of pigment based upon the weight of the coating composition when dried.

7. A coating composition which when applied on a fibrous nonwoven sheet of polyolefin and dried provides a sheet having antistatic properties, high water barrier and antislip properties, said composition consisting essentially of
- (a) a water-insoluble binder resin capable of wetting the polyolefin sheet, having a Tg of from about 20°–50° C and which, in the form of an aqueous dispersion, does not coagulate in the presence of component (c), said binder resin being present in an amount of from about 40–80% by weight, based upon the weight of the composition when dried;
- (b) from about 15–40% by weight, based on the amount of binder resin, of a water-insoluble wax which is dispersible in water at a concentration of 10% by weight based on the total amount of wax and water, said wax requiring for dispersion in water only a nonionic surfactant or a mixture of two or more nonionic surfactants in an amount of at least 15% and not more than 100% by weight based on the amount of wax, said nonionic surfactant having a hydrophilic-lipophilic balance of from about 6–10;
- (c) from about 5–15% by weight, based on the amount of binder resin, of an antistat having the formula $M_n R_{3-n} PO_4$ where M is selected from the group consisting of lithium, sodium, potassium and ammonium ions, R represents an alkyl group containing from 3 to 5 carbon atoms, and *n* is selected from the integers 1 and 2;
- (d) a nonionic surfactant having a hydrophilic-lipophilic balance of from about 6–10, said surfactant being present in an amount of from about 15–100% by weight based on the amount of wax; and
- (e) water; solids being present in said composition in an amount of from about 10–40% by weight.

8. The composition of claim 7 containing from about 1–6% by weight of pigment based upon the weight of the coating composition when dried.

9. A fibrous nonwoven sheet of polyolefin coated with the composition of claim 1 and dried, said sheet exhibiting antistatic and antislip properties and high water barrier.

10. A fibrous nonwoven sheet of polyolefin coated with the composition of claim 6 and dried, said sheet exhibiting antistatic and antislip properties and high water barrier.

11. A coated nonwoven sheet of claim 10 wherein the sheet is composed of film-fibril elements of polyolefin.

12. The coated nonwoven sheet of claim 11 wherein the polyolefin is polyethylene.

* * * * *